S. N. POOL, Jr.
CIRCULAR-SAW.

No. 192,526. Patented June 26, 1877.

WITNESSES
Franck L. Ourand
Frank Galt

INVENTOR
Solomon N. Pool Jr.
By Alexander Mason
ATTORNEYS

UNITED STATES PATENT OFFICE.

SOLOMON N. POOL, JR., OF ALPHARETTA, GEORGIA.

IMPROVEMENT IN CIRCULAR SAWS.

Specification forming part of Letters Patent No. 192,526, dated June 26, 1877; application filed June 1, 1877.

*To all whom it may concern:*

Be it known that I, SOLOMON N. POOL, Jr., of Alpharetta, in the county of Milton and in the State of Georgia, have invented certain new and useful Improvements in Saw - Planers; and do hereby declare that the following is a full, clear, and exact description thereof, reference being had to the accompanying drawings, and to the letters of reference marked thereon, making a part of this specification.

My invention relates to circular saws; and it consists in the construction of projections on the side of the saw-blade to form planing-teeth of the same metal as the saw-blade, as will be hereinafter more fully set forth.

In order to enable others skilled in the art to which my invention appertains to make and use the same, I will now proceed to describe its construction and operation, referring to the annexed drawing, in which—

Figure 1:
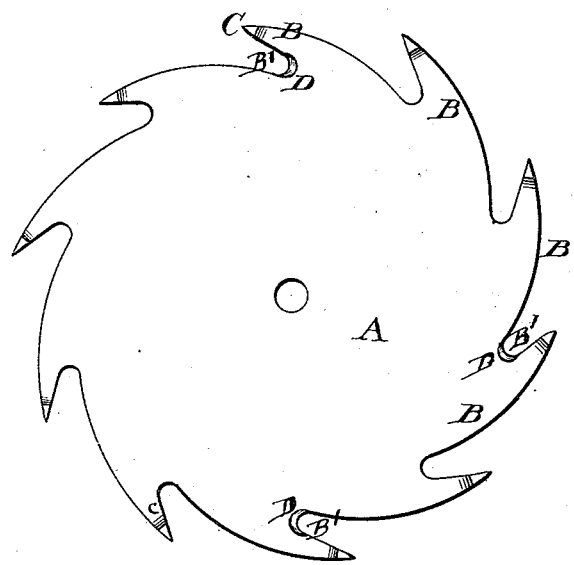
Figure 2:
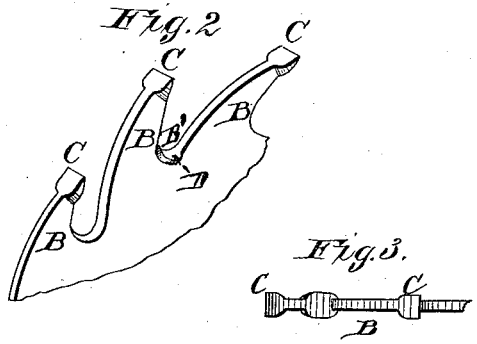
Figure 3:

Figure 1 is a side view of a circular saw embodying my invention. Figs. 2 and 3 are detailed views of parts thereof.

A represents an ordinary circular saw, formed with the curved saw-teeth B B of the usual form, so as to make throats B' in the saw-plate.

The points of the teeth B are swaged to form the broad cutters C in the same manner as ordinarily done in circular saws.

In the throats B' the metal of the saw-plate is swaged to make projecting edges or cutting-blades D D on both sides of the saw, which blades can easily be sharpened both at the same time, and form planing-teeth which plane the lumber at the same time as it is cut.

I am well aware that planing-teeth or circular teeth are not new; hence I do not claim such as being broadly my invention.

The planing-teeth may be formed after every cutting-tooth, or after every second, third, or fourth, as desired.

Having thus fully described my invention, what I claim as new, and desire to secure by Letters Patent, is—

A circular saw, having teeth B and projecting edges or cutting-blades D D formed in the throat B' and upon both sides of the saw-plate, substantially as herein set forth.

In testimony that I claim the foregoing I have hereunto set my hand this 9th day of May, 1877.

SOLOMON N. POOL, JR.

Witnesses:
E. V. MCCOLLUM,
A. P. LATHAM.